J. H. GILES.
LOCK.
APPLICATION FILED SEPT. 7, 1920.
1,395,636.
Patented Nov. 1, 1921.
2 SHEETS—SHEET 1.
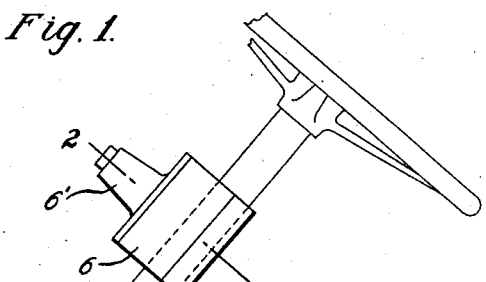
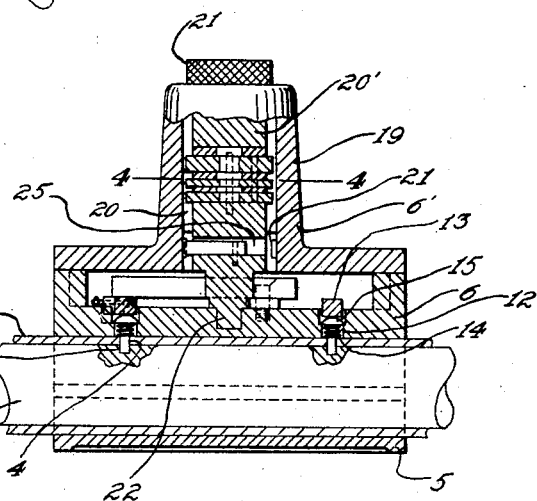
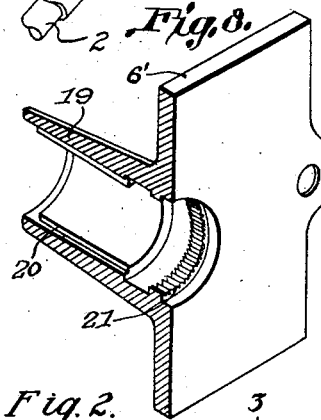
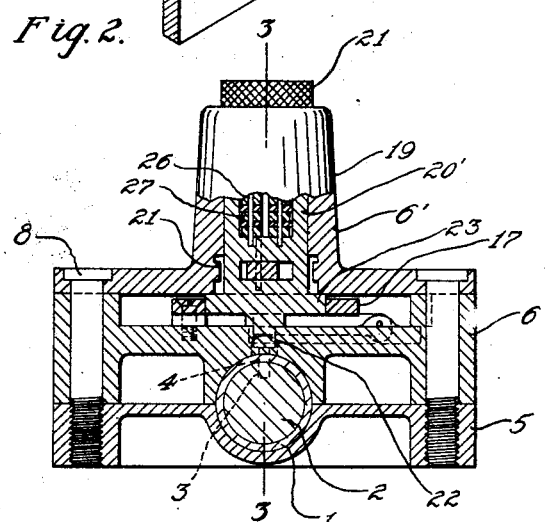
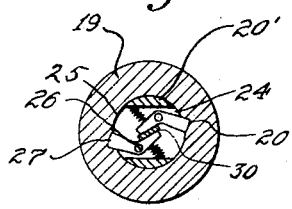
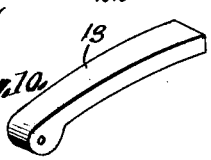
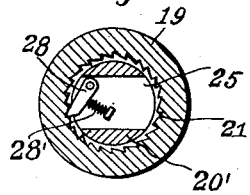
J. H. Giles
INVENTOR
BY Victor J. Evans
ATTORNEY

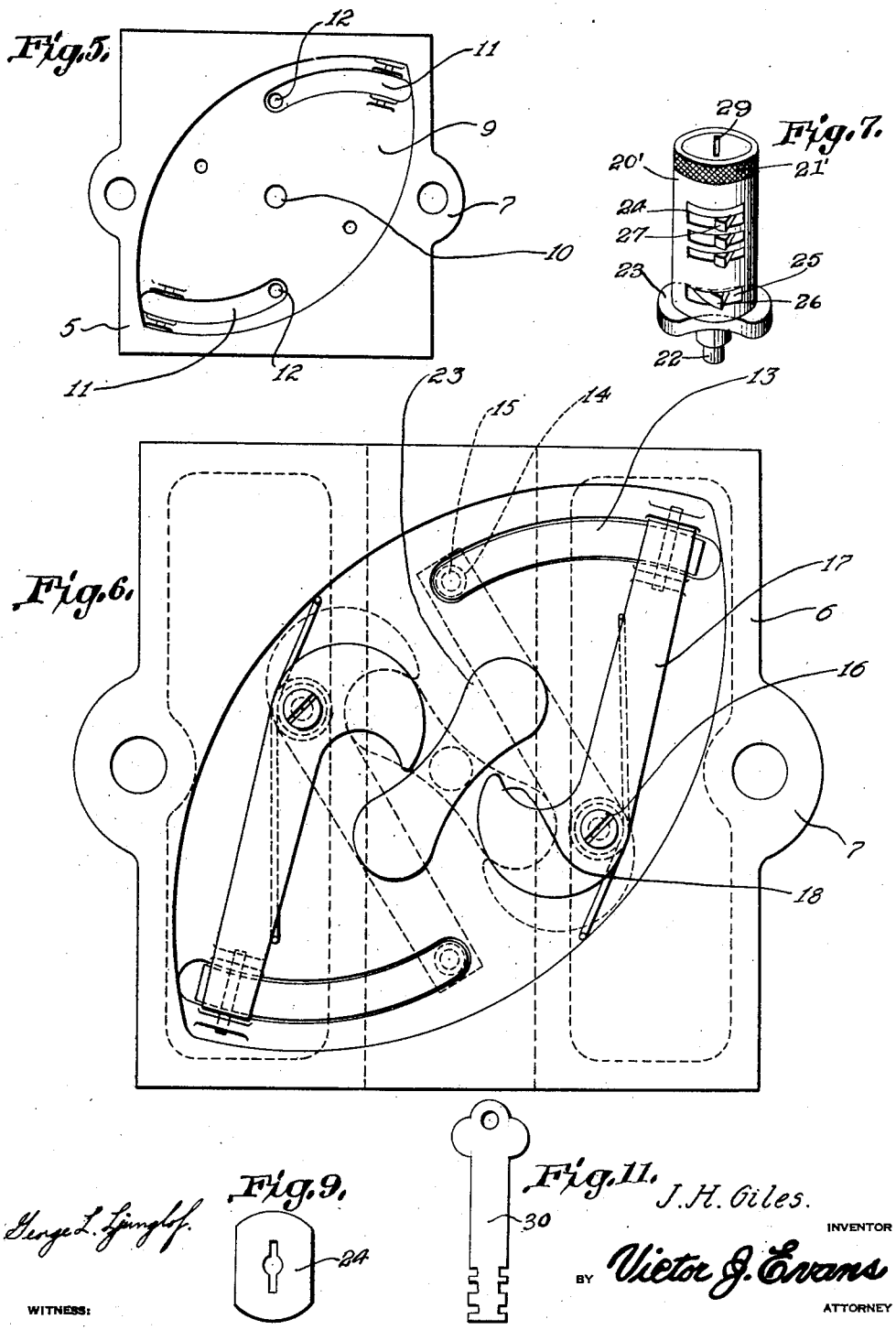

UNITED STATES PATENT OFFICE.

JESSE H. GILES, OF OGDEN, UTAH.

LOCK.

1,395,636.  Specification of Letters Patent.  Patented Nov. 1, 1921.

Application filed September 7, 1920. Serial No. 408,455.

*To all whom it may concern:*

Be it known that I, JESSE H. GILES, a citizen of the United States, residing at Ogden, in the county of Weber and State of Utah, have invented new and useful Improvements in Locks, of which the following is a specification.

My present invention has reference to a means for locking the steering post to the steering column of an automobile so that the machine cannot be used by other than authorized persons.

The object is the provision of simple, cheap and effective means whereby the steering post of an automobile may be locked to the steering column thereof.

A further object is the production of a lock which may be readily arranged and securely retained on the steering column of an automobile without materially interfering with or weakening the construction of the column and in which spring influenced dogs are employed, designed, when the parts are actuated to one position to interengage with the steering post to lock the same against turning, and when brought to another position to permit of the free turning of the steering post in the steering column.

Other objects and advantages will present themselves as the nature of the invention is better understood, reference being had to the accompanying drawings in which there is illustrated a simple and satisfactory embodiment of the improvement reduced to practice, and in which:—

Figure 1 is a view illustrating the application of the improvement.

Fig. 2 is a sectional view approximately on the line 2—2 of Fig. 1, on an enlarged scale.

Fig. 3 is a sectional view approximately on the line 3—3 of Fig. 2.

Fig. 4 is a sectional view approximately on the line 4—4 of Fig. 3.

Fig. 5 is a plan view of one of the lock sections, with the lock works removed.

Fig. 6 is a similar view but showing the works in position.

Fig. 7 is a perspective view of the barrel.

Fig. 8 is a sectional perspective view of the second section of the lock casing.

Figs. 9 to 11 illustrate details.

Fig. 12 is a transverse sectional view through the barrel in a line with the spring influenced pawl.

In the drawings, the steering column of an ordinary automobile is indicated by the numeral 1, and the steering post which is received in the column by the numeral 2. The post 2 is formed with notches or depressions 3, and the steering column 1 is provided with openings which are designed to register with the said depressions, the same being indicated by the numeral 4.

My improved lock comprises two sections which, for distinction, are indicated by the numerals 5 and 6 respectively. Each of the sections has a semi-cylindrical bore therethrough to receive the steering column, and the sections have their ends formed with enlargements in the nature of ears 7, through which are passed securing elements preferably in the nature of screws 8 that have milled heads, and the said heads are received in reamed portions which surround the openings in one of the sections, whereby the heads are retained flush with the lock casing.

The section 6 has an elliptical pocket 9 therein provided with a central cylindrical depression 10, and opposed arcuate depressions 11—11 adjacent to the diagonally opposed end walls thereof. The depressions, at the opposite ends thereof have openings 12 therethrough which are designed to register with the openings in the steering column and with the notches in the post when the post is turned to one position with respect to the column.

In each of the depressions 11 there is an arcuate plate 13 that is influenced by a spring 14 in an outward direction. Each of the plates has at its end a stud 15, and the studs are received in the openings 12 and are designed, when the plates 13 are forced against the pressure of their springs to project through the openings in the column and enter the notches in the post for locking the post to the column.

Pivotally secured, as at 16, in the pocket 8 are oppositely arranged dogs 17. These dogs have their inner ends formed with lips 18, and each dog overlies one of the plates 13.

The lock section 6 carries a cylindrical extension 19 that has its bore notched, as at 20 and provided with teeth or serrations 21.

In the cylinder or sleeve 19 is a barrel 20'. This barrel has its outer end, which extends through the sleeve 19, milled, as at 21, and has its inner end provided with a stub shaft 22 that is received in the opening 10. Inward of the shaft 22 the barrel 20 is provided with cam members 23 that are disposed in contacting engagement with the lips 18 of the arms 17. It will be apparent that by turning the barrel in the sleeve 19 the cam elements 23 thereon, contacting with the lips 18 of the dogs 17, will swing the said dogs, on their pivots 16, causing the same to ride over the plates 13, and depressing the spring influenced ends of the said plates so that the lugs 15 thereon will pass through the openings 12 to project the same through the openings in the steering column to cause the same to enter the notches in the post 2, and thus lock the post on the column.

The barrel 20 is provided with spaced openings 24 and 25 respectively. In the openings 24 there are pivoted, as at 26, spring influenced dogs 27. The engaging or active ends of the dogs are oppositely opposed, and the said dogs being spring influenced will be normally projected through the opening 24 and received in the notches 20 of the sleeve 19. The second opening 25 has pivoted therein a ratchet tooth 28 which is influenced by a spring 28' and which is designed to engage with the teeth or serrations 21 in the lock section 6.

The operator, by turning the barrel in the sleeve may bring the dogs 26 and the ratchet element 28 in engagement with the notches and serrations 20 and 21 when the cam elements 23 thereof have influenced the dogs to lock the steering post to the steering column, and to bring these members to releasing position, so that the machine may be actuated. The barrel 20 has at its outer end a revoluble key receiving slotted disk 29 through which there is designed to be passed a key 30. The key 30 is kerfed or notched so that the same will actuate both the dogs and the ratchet element 28 to retract the dogs against their springs, and to also cause the elements 28 to ratchet over the teeth or serrations 21, so that the dogs will contact with the bore of the sleeve and be thus held from entering the notches 20 thereof, the ratchet element 28 holding the barrel against accidental turning.

It is believed that the foregoing description, when taken in connection with the drawings will fully set forth the simplicity and advantages of the construction without further detailed description. It is to be understood that the nature of the invention is such as to render the same susceptible to all such changes as fall within the scope of what I claim.

This locking mechanism is not necessarily confined to the locking of the steering column of an automobile but may be applied with equal efficiency to pad-locks, door-locks or locks of any kind.

Having thus described the invention, what I claim is:—

1. In combination with the notched column and notched steering post of an automobile; of means for locking the post to the column, comprising spring influenced lugs normally out of the notches of the steering post, means for moving the lugs into said notches, means retaining the lugs so positioned, and means operable to permit the spring influenced lugs moving out of said notches and for releasing said retaining means.

2. In combination with the notched column and notched steering post of an automobile; of means for locking the post to the column, comprising spring influenced lugs guided through the notches of the steering column and normally out of the notches of the steering post, revoluble means for forcing the lugs into the notches of the steering post, means associated with said first mentioned means for retaining the lugs so positioned, and means for actuating the first mentioned means for permitting the lugs moving out of the notches and for releasing the retaining means.

3. In combination with the notched column and notched steering post of an automobile; of means for locking the post to the column, comprising a casing surrounding and secured to the column, spring influenced lugs in the casing guided through the notches of the column and normally out of the notches of the post, revoluble means carried by the casing for influencing the lugs to cause the same to enter the notches of the post, means for retaining the lugs so positioned, and revoluble means carried by the casing for permitting the lugs to be influenced by their springs to a post releasing position and for releasing the retaining means.

4. In combination with the notched column and notched steering post of an automobile; of means for locking the post to the column, comprising a casing surrounding and secured to the post, plates in the casing having lugs thereon received in the notch of the column, spring means for normally retaining the lugs out of the notch of the post, means slidable over the plates for depressing one end thereof to bring the lugs thereon into the notches of the post, means for retaining said first mentioned means in such position, and means for returning the first mentioned means to their initial position to permit of the lugs of the spring influenced plates being brought out of the notches of the steering post.

5. In combination with the notched column and notched steering post of an automobile; of locking means for the post, comprising a casing surrounding and secured to the column, tiltable spring influenced plates having lugs thereon guided through the casing and through the notches of the steering post, pivoted means in the casing and overlying the plates, revoluble means in the casing for engaging with the last mentioned means to cause the same to move over the plates to force the lugs thereof into the notches of the post, means for retaining the last mentioned means in such position, and means operable to bring the plate engaging means to initial position and for releasing the retaining means.

6. In combination with the notched column and notched steering post of an automobile, of means for locking the post to the column comprising a casing surrounding and secured to the column, plates in the casing spring influenced in one direction, lugs thereon passing through the casing and entering the notches in the steering post, guide means for the said plates, pivoted means contacting with the plates, cam means operable for swinging said pivoted means over the plates for bringing the lugs thereof into the notches of the post, retaining means for said cam means, and means for operating the said cam means to bring the pivoted means to initial position to permit of the spring influenced plates bringing the lugs thereof out of the notches of the steering post and for releasing the retaining means.

7. In combination with the notched column and the notched steering post of an automobile, of means for locking the post to the column, comprising a casing surrounding and secured to the column, diagonally opposed plates in the casing, spring means for tilting the plates in one direction, lugs carried by the plates passing through the casing and entering the notches in the column, pivoted means in the casing and overlying the plates, cam means for engaging said pivoted means for swinging the latter to cause the same to depress the plates and force the lugs into the notches of the post, retaining means for said cam means, and means for actuating the cam means to return the same to initial position to release the plates to permit of the lugs moving out of the notches and for releasing the retaining means.

8. In combination with the notched column and notched steering post of an automobile; of means for locking the post to the column, comprising a casing surrounding and secured to the column, diagonally opposed tiltable plates spring influenced in one direction in the casing, lugs thereon passing through the casing and entering the notches in the column, arms having offset ends pivoted in the casing and resting on the respective plates, a revoluble element in the casing having a cam associated therewith in the path of contact with the offset ends of the arms, whereby to swing the arms to cause the same to travel over the plates to bring the lugs thereof into the notches of the post, means for retaining the revoluble means in such position, means for turning the revoluble means in an opposite direction to move the arms to initial position and for releasing said retaining means.

9. In combination with the notched column and notched steering post of an automobile, of means for locking the post to the column, comprising a casing surrounding and secured to the column, spring influenced plates tiltable in one direction guided in the casing, lugs on said plates passing through the casing and entering the notches of the column, pivoted arms having offset ends in the casing, and said arms resting over the respective plates, a notched sleeve on the casing having a serrated portion in the bore thereof, a barrel revoluble in the sleeve, spring influenced dogs carried by the barrel, designed, when the latter is turned to one position, to enter the notches of the sleeve, a spring influenced member carried by the barrel for engaging the serrations in the sleeve, cam members on the barrel for engaging with the offset ends of the arms to move the latter over the plates to depress the said plates to cause the lugs thereof to enter the notches in the post, and revoluble means in the barrel for releasing the dogs to permit of the turning of the barrel and the ratchet means for bringing the parts to initial position.

In testimony whereof I affix my signature.

JESSE H. GILES.